UNITED STATES PATENT OFFICE.

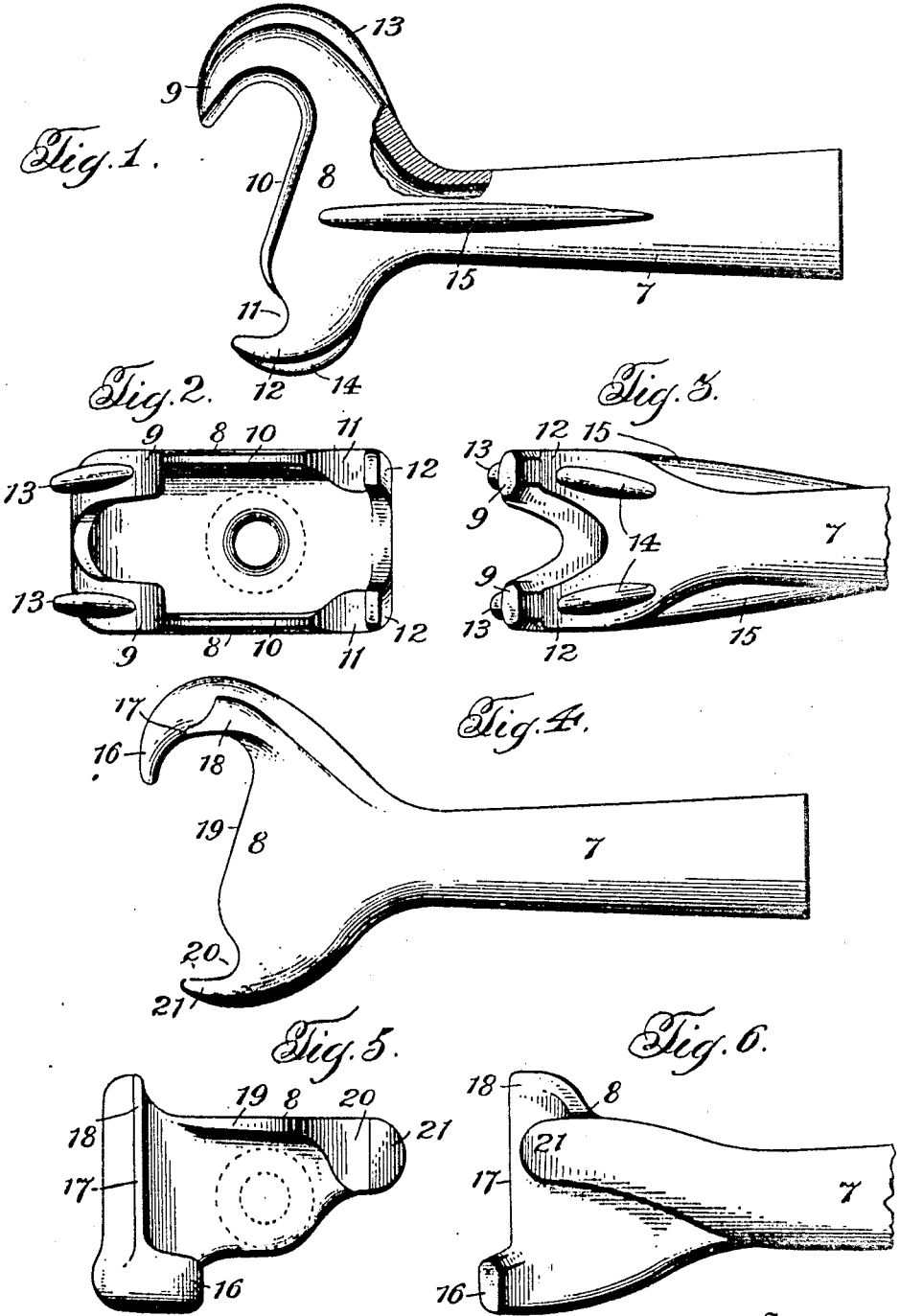

LESTON W. McGOWAN, OF LOUGHMAN, FLORIDA.

CAR-MOVER.

1,058,450.　　　　　　Specification of Letters Patent.　　　Patented Apr. 8, 1913.

Application filed May 6, 1912. Serial No. 695,558.

*To all whom it may concern:*

Be it known that I, LESTON W. McGOWAN, a citizen of the United States, residing at Loughman, in the county of Polk and State of Florida, have invented certain new and useful Improvements in Car-Movers, of which the following is a specification, reference being had therein to the accompanying drawing.

It is an object of this invention to provide a device that easily may be engaged with a wheel for turning it and that readily may be disengaged when desired, and in one of its forms the device is adapted for turning a wheel in either direction.

When read in connection with the description herein, the details of construction and arrangement of parts contemplated by the invention will be apparent from the accompanying drawing, forming part hereof, wherein embodiments of the invention particularly adapted for use on car-wheels are disclosed, for purposes of illustration. However, it is to be understood that it is not the intention necessarily to be limited to the precise delineations herein in interpretation of claims hereinafter, as it is obvious that parts can be variously formed and organized within the limits prescribed by the claims without departing from the nature and spirit of the invention.

Like reference-characters refer to corresponding parts in the views of the drawing, of which—

Figure 1 is a side view, Fig. 2 an end view, and Fig. 3 a view of another side of one form; and Fig. 4 is a side view, Fig. 5 an end view, and Fig. 6 a view of another side of another form.

Having more particular reference to the drawing, 7 designates a shank or bar having integrally formed on one end an enlarged operating portion or head 8. The shank may be hollow, as shown, to provide a socket to receive a handle, or it may be integrally extended to form the handle.

The head, of the form shown by Figs. 1, 2, and 3, on one side is integrally formed with hooks 9 curving from the head in such manner that they may be brought into engagement with the inner side of the rim of a car-wheel, continuing from the inner curve of these hooks is a substantially straight surface 10 positioned to contact with and conform to the tread of a car-wheel, and on the opposite side of the head from the hooks are recesses 11 arranged to receive the flange of a car-wheel and projections 12 arranged to seat against the outside of the flange and to keep the hooks on the other side in engagement around the edge of the wheel-rim.

The head is reinforced and strengthened by integrally-formed ribs 13 extending over the hooks 9, 14 on the outside of projections 12, and 15 extending on the sides of the head and along the shank or bar for a portion of its length.

The head, of the type illustrated by Figs. 4, 5, and 6, on one side is formed with a hook 16 curving from the head in such manner that it may be brought into engagement with the inner side of the rim of a car-wheel. Continuing from hook 16 and somewhat inset therefrom is a substantially straight lug 17 extending across and beyond the head in the form of a lateral projection 18. This lug is arranged to seat against the side of the wheel-rim. Extending across the head from near the projecting end of the lug, and at substantially right angles thereto when looking at the end of the head as in Fig. 5, is a raised surface or edge 19 somewhat inset from the lug and positioned to contact with and conform to the tread of a car-wheel. The surface or edge 19 on the side of the head opposite to the hook 16 and lug 17 is depressed into a recess 20 arranged to receive the flange of a car-wheel, and projecting from the head, longitudinally with respect to the entire implement, is a projection 21, which forms a side of recess 20 and is arranged to seat against the side of the wheel-flange and to keep the hook 16 in engagement around the edge of the wheel-rim.

When the form shown by Figs. 1, 2, and 3 is to be applied to a car-wheel, the operator stands outside of the track and with the implement at an angle to the plane of the wheel, and he places the hooks 9 under the wheel-rim with the curves of the hooks against the edge of the rim. Then he moves the handle-end of the implement toward the track and brings the surfaces 10 against the tread of the wheel and the recesses 11 and projections 12 into contact with the wheel-flange, whereby the hooks are held in engagement with the rim. Then he moves the shank upwardly or downwardly as a lever to turn the wheel in the direction desired, during this operation the wheel-rim being clamped between one of the hooks and the surface 10 that continues from the other hook. When the operator desires to remove the tool, he moves the shank outwardly with respect to the track to release the projections 12 from the flange and then moves the head laterally off the wheel.

The form shown by Figs. 4, 5, and 6 is applied to a right-hand wheel to move a car away from the operator and to a left-hand wheel to move it toward him. The head is held at an angle to the wheel and the hook 16 is placed under the rim. Then the shank is moved to bring the surface 19 against the tread and the projection 21 over the side of the wheel-flange, whereby the hook is held in engagement with the rim. Then he moves the shank upwardly or downwardly, as the case may be, to press the surface 20 against the tread and to pry the wheel in the direction desired. It will be seen that, if the car takes on too great a speed to be followed by the implement, and that when it is desired to remove the implement for any other reason, the shank is merely moved in a direction opposite to operating movement, when the retaining-projection 21 is released from the side of the flange and the hook removed from the rim by a quick lateral movement. The head is cut away from the edge or surface 19 in order that the implement may be given the movement from position approximately radial to the wheel toward a tangential position necessary to release it, and it is cut away also to facilitate the placing of the implement on the wheel.

In both forms of heads, the surfaces that contact with the tread of the wheel are placed at an angle to the longitudinal line of the implement, in such manner that when these surfaces are in contact with the tread the shank will incline outwardly of the track to enable the operator to stand outside of the track when using the implement.

Having thus described my invention, what I claim as new, and desire to secure by Letters Patent, is—

1. A wheel-turner comprising an operating-head having extending from one side thereof a hook arranged to engage under the rim of a wheel, removed from said hook a surface arranged to contact with the tread of the wheel, and continuing from said surface a recess arranged to have the flange of the wheel seat therein and a projection arranged to seat against the side of the flange and hold the hook in engagement with the rim, the head being cut away from said contact surface whereby the turner may be moved in one direction to release said surface from contact with the tread.

2. A wheel-turner comprising a shank and an operating-head thereon, said head having extending from one side thereof a hook arranged to engage under the rim of a wheel, removed from said hook a surface disposed at an angle to the longitudinal line of the shank and arranged to conform to and contact with the tread of the wheel, and continuing from this surface a recess arranged to have the flange of the wheel seat therein and a projection arranged to seat against the side of the flange and hold the hook in engagement with the rim.

3. A wheel-turner comprising a shank and an operating-head thereon, said head having extending from one side thereof a hook arranged to engage under the rim of a wheel, removed from said hook a surface disposed at an angle to the longitudinal line of the shank and arranged to conform to and contact with the tread of the wheel, and continuing from said surface a recess arranged to have the flange of the wheel seat therein and a projection arranged to seat against the side of the flange and hold the hook in engagement with the rim, the head being cut away from said contact surface whereby the turner may be moved in one direction to release said surface from contact with the tread.

4. A wheel-turner comprising a shank and an operating-head thereon, said head having extending from one side thereof a hook arranged to engage under the rim of a wheel, continuing from said hook and somewhat inset therefrom a substantially straight lug arranged to seat against the side of the wheel-rim, extending across the head at substantially right angles to said lug a raised surface somewhat inset from the lug and positioned to contact with the tread of the wheel, and at the end of said surface opposite to said lug a depression arranged to receive the flange of the wheel and a projection arranged to contact with the side of the flange.

5. A wheel-turner comprising a shank and an operating-head thereon, said head having extending from one side thereof a hook arranged to engage under the rim of a wheel, continuing from said hook and somewhat inset therefrom a substantially straight lug arranged to seat against the side of the wheel-rim, extending across the head at substantially right angles to said lug a raised surface somewhat inset from the lug and disposed at an angle to the longitudinal line of the shank and positioned to contact with the tread of the wheel, and at the end of said surface opposite to said lug a depression arranged to receive the flange of the wheel and a projection arranged to contact with the side of the flange.

In testimony whereof I affix my signature in presence of two witnesses.

LESTON W. McGOWAN.

Witnesses:
D. B. BROWN,
F. L. WEBB.

Copies of this patent may be obtained for five cents each, by addressing the "Commissioner of Patents. Washington, D. C."